July 18, 1967 TAKAO HISANO 3,332,049

MAGNETIC CORE UNIT WITH SHIELDED WINDING

Filed Nov. 30, 1965

3 Sheets-Sheet 1

INVENTOR.
Takao Hisano
BY
Pierce, Scheffler & Parker
Attorneys

MAGNETIC CORE UNIT WITH SHIELDED WINDING

Filed Nov. 30, 1965

INVENTOR.
Takao Hisano
BY
Pierce, Scheffler & Parker
Attorneys

INVENTOR.
Takao Hisano
BY
Pierce, Scheffler & Parker
Attorneys

United States Patent Office 3,332,049

Patented July 18, 1967

3,332,049

MAGNETIC CORE UNIT WITH SHIELDED WINDING

Takao Hisano, Yokosuka-shi, Japan, assignor to TDK Electronics Company, Limited, Tokyo, Japan, a corporation of Japan Filed Nov. 30, 1965, Ser. No. 510,512
1 Claim. (Cl. 336—83)

ABSTRACT OF THE DISCLOSURE

This invention relates to a core unit, wherein terminals and a shield-connecting terminal are provided on terminal fixing bases surmounting flanges located at both ends of a bobbin body. Coils are wound on said bobbin body through a shield foil; lead wires of said coils and the shield foil are connected with the above mentioned terminals and shield-connecting terminals. A magnetic core consisting of two parts, each of which has a side wall opened in the upper part and bent in the form of a U, and a columnar part, provided on the inside surface of each side wall, is inserted at its said columnar part into an aperture provided at the center of said bobbin from each end of said aperture, and said magnetic core and bobbin are contained in a shield can through a pressure spring.

This invention relates to core units to be used for transformers for communication.

Except special ones, conventional magnetic cores of ferrite to be used for transformers for communication and induction coils are mostly pot type magnetic cores and internal iron or external iron type magnetic cores. In the pot type magnetic core, holes or slits are made in an upper disk or annular wall forming a component part of the core so that pull-out wires of coils wound within the magnetic core may be pulled out through said holes or slits. In case such magnetic core is to be used for such transformer for communication machines as, for example, a differential transformer having many pull-out terminals, it will be necessary to make so many holes or slits for pulling out the respective pull-out wires. However, if such many holes or slits are made, the magnetic resistance of the magnetic core will increase and therefore it will be difficult to obtain favorable characteristics of the transformer. If the number of the holes or slits is therefore decreased so that a proper number of pull-out wires may be pulled out through each common hole or slit, the characteristics of the transformer will deteriorate due to a floating capacity or the like produced between the pull-out wires. On the other hand, the internal iron or external iron type magnetic core has a form adapted to be used for transformers for communication machines having many pull-out terminals as mentioned above. However, in such magnetic core, as the magnetic circuit includes only a part of the coil wound on the magnetic core, the leakage and coupling of magnetic fluxes will be likely to occur. Further, in such case, within the housing of the transformer, there will remain a considerable still available space except the volume occupied by the magnetic core coils and terminal plates. In view of the fact that the characteristics of the transformer depend on the volume of the magnetic core, it can not be said to be proper to leave such considerable available space within the housing and it is desirable for the transformer to well occupy the capacity of the housing.

Further, in connecting the external terminal for electrostatic shielding and the magnetic core coil with each other as in the conventional transformer for communication, there has been used a method wherein a pull-out wire as soldered to or folded in a shielding metal foil is wound into a coil and is fixed at the other end to a connecting terminal by soldering or the like. Therefore, there are defects that so many steps are required for shielding that the cost of manufacturing the coil will be higher and that, as the connecting part of the shielding foil and pull-out wire expands, the space available for the winding will be smaller and, though it is supplemented by such means as making the diameter of the winding wire smaller, the transmitting characteristics of the transformer will naturally deteriorate. Further, the above mentioned expansion of the connecting part will also make the products irregular. That is to say, as the high frequency characteristics of the transformer depend mostly on the leakage inductance and floating capacity and are related with the winding spacing and the distance of the winding from its shielding, the nonuniformity of said expansion will make the transformer irregular.

In the connection by the folding method wherein the expansion is comparatively small or uniform, as the wire is not soldered, it will not be well connected. Thus the conventional shielding connecting method required a high degree of skill.

The present invention has been suggested to eliminate the above mentioned defects.

A principal object of the present invention is to provide a core unit wherein an entire coil is contained in a magnetic core and is fixed by injecting a packing material through an opening in the upper part of the magnetic core so that the coil may be protected from moisture and fixed with only the magnetic core without using any specific case.

Another object of the present invention is to provide a core unit wherein, as the upper part of a magnetic core is opened, a terminal plate can be set in said part and, even when there are many pull-out wires, the terminals can be fitted without impairing the characteristics of the magnetic core.

A further object of the present invention is to provide a core unit wherein no such wire connecting material as in the past is required between the terminal and shield foil and the connection and shielding can be made easily, positively and quickly.

A still further object of the present invention is to provide a core unit wherein, as there is no such soldered or folded connecting part as in the past on the shield foil surface included in the magnetic core coil, the coil spacing by shielding will be uniform and there will be little fluctuation in the electric characteristics and the finished contour of the coil of the product.

Another object of the present invention is to provide a core unit wherein a shield can be easily connected to an external connecting terminal without interfering with the winding and assembling of coils by soldering a projecting part of a shield foil to said connecting terminal so as to be along a cut part of a bobbin.

The accompanying drawings shall now be explained.

Figure 1:
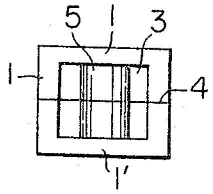
FIGURE 1 is a plan view of a magnetic core.
Figure 2:
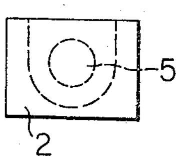
FIGURE 2 is a side view of the same.
Figure 3:
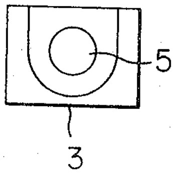
FIGURE 3 is a side view showing one side of the formed part of the same.
Figure 4:
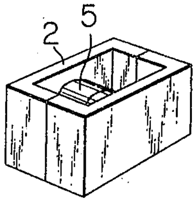
FIGURE 4 is a perspective view of the same.

In FIGURES 1 to 4, 1 and 1' are magnetic core parts to integrally form a core with opened sides butted together. 2 is a side wall of the core part. 3 is a bottom. Said magnetic core is formed of the two side walls 2 each bent in the form of U and the botom 3 surrounded by said side walls 2. A columnar part 5 is provided on the inside surface of the side wall opposed to the opened side 4 so as to project toward said opened side 4. The inside surface of the bottom 3 is semicylindrical.

Figure 5A:
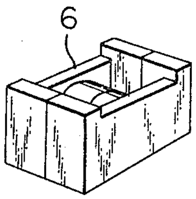
FIGURES 5A and 5B illustrate other embodiments of magnetic cores.
Figure 5B:
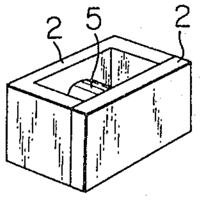

FIGURE 5A illustrates another embodiment wherein the magnetic core parts have respective cuts for receiving fixing bases 10 and 10' of the bobbin. FIGURE 5B illustrates another embodiment wherein one of the magnetic core parts is merely a plate.

For this magnetic core is used a magnetic material of the composition shown in Table 1. That is to say, a magnetic material of a high magnetic permeability and high magnetic stability is obtained by using as a main element manganese oxide, zinc oxide or iron oxide, compounding and adding such impurities as $SiO_2$, $CaCO_3$, $V_2O_5$, $Bi_2O_3$ and CaO to it and passing them through a firing step under a partial pressure of less than 5% oxygen and then through an inert atmosphere in a cooling step above 1000° C.

TABLE 1

| | Mol. Percent | | Wt. Perlent |
|---|---|---|---|
| H5A | | | |
| $Fe_2O_3$ | 53.35 | $SiO_2$ | 0.007 |
| MnO | 26.4 | $CaCO_3$ | 0.03 |
| ZnO | 20.25 | $V_2O_5$ | 0.07 |
| H5B | | | |
| $Fe_2O_3$ | 52.60 | $SiO_2$ | 0.007 |
| MnO | 27.40 | $CaCO_3$ | 0.03 |
| ZnO | 20.00 | $Bi_2O_3$ | 0.03 |
| H5C | | | |
| $Fe_2O_3$ | 51.75 | $SiO_2$ | 0.003 |
| MnO | 22.50 | CaO | 0.02 |
| ZnO | 25.75 | $Bi_2O_3$ | 0.04 |

Figure 6:
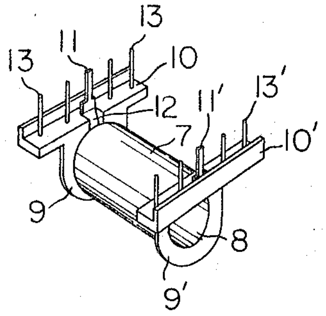
FIGURE 6 is a perspective view of a bobbin.

FIGURE 6 illustrates a bobbin made of a synthetic resin. 7 is a bobbin body in the center of which is made a cylindrical hole 8. 9 and 9' are flanges provided at both ends of the bobbin body. Said flanges 9 and 9' are semicylindrical in the lower parts and are provided in the upper parts with respective terminal fixing bases 10 and 10' parallel with each other in the horizontal direction. Each of shield connecting terminals 11 and 11' is set in the middle on the upper surface of each of said terminal fixing bases 10 and 10', respectively. Each of slopes 12 and 12' is made toward the upper surface of the bobbin body 7 from the inside of each of said shield connecting terminals 11 and 11', respectively. Terminals 13 and 13' are provided on both sides of each of said shield connecting terminals 11 and 11', respectively.

Figure 7:
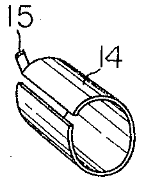
FIGURE 7 is a perspective view of a shield foil.
Figure 8:
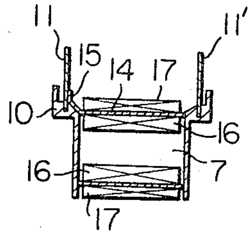
FIGURE 8 is a partly sectioned explanatory view of a bobbin on which are wound coils.
Figure 9:
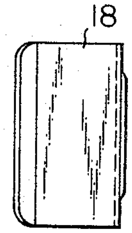
FIGURE 9 is an elevation of a pressure spring.
Figure 10:
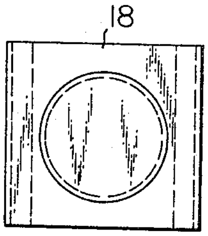
FIGURE 10 is a bottom view of the same.
Figure 11:
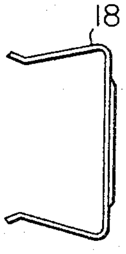
FIGURE 11 is a side view of the same.
Figure 12:
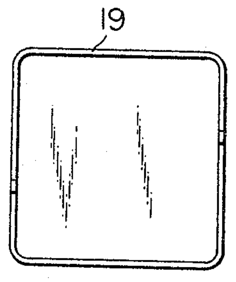
FIGURE 12 is a plan view of a shield can.
Figure 13:
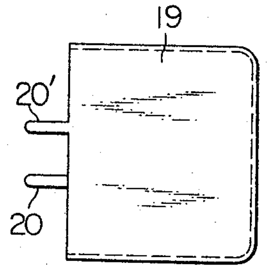
FIGURE 13 is a side view of the same.
Figure 14:
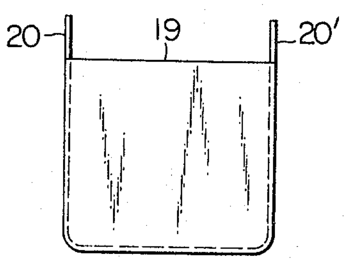
FIGURE 14 is an elevation of the same.

FIGURE 7 illustrates a band-shaped shield foil 14 having a width substantially equal to the width of the coil wound on the coil bobbin in FIGURE 6, a length sufficient to cover the wound coil and a projecting part 15 in a part of its periphery.

When the above described bobbin is to be used for a transformer, a primary winding 16 is first wound on the bobbin body and the projecting part 15 of said shield foil 14 is then made to coincide with the cut slopes 12 and 12' of the terminal fixing bases 10 and 10', so that said primary winding 16 may be covered with the shield foil 14. The primary winding is soldered at both ends to the terminals 13'. A secondary winding 17 is then wound on said shield foil 14 and is soldered at both ends to the terminals 13. The projecting part 15 of the shield foil 14 made coincide with the above described cut slopes 12 and 12' is then soldered to the shield connecting terminals 11 and 11' so as to be along the slopes 12 and 12'. The magnetic core parts 1 and 1' are then separated from each other. The columnar part 5 of the magnetic core part 1 is first inserted into the hole 8 in the bobbin body 7 and the terminal fixing base 10 is brought into contact with the upper side of the magnetic core part 1. The magnetic core part 1' is then inserted into the bobbin in the same manner as in the above and the terminal fixing base 10' is brought into contact with the upper side of the magnetic core part 1'.

In FIGURES 9 to 11, 18 is a pressure spring made of a resilient material substantially in the form of U. In FIGURES 12 to 14, 19 is a shield can provided with ears 20 and 20' on the respective sides of the opened part.

Figure 15:
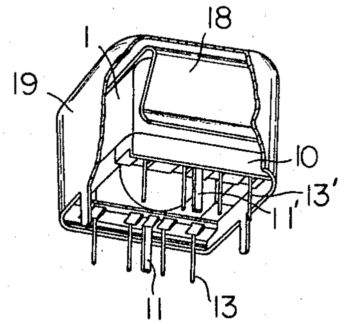
FIGURE 15 is a perspective view of a core unit.
Figure 16:
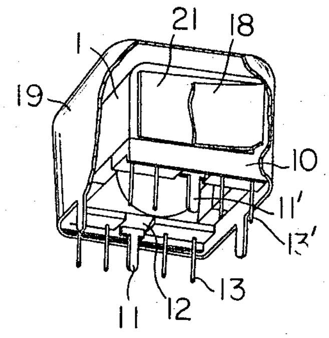
FIGURE 16 illustrates another embodiment of a core unit.

In the above described combination of the magnetic core and bobbin, the pressure spring 18 is fitted on the sides of the magnetic core and the bottom 2 of the magnetic core is inserted into the shield can 19. FIGURE 15 illustrates a completed state. FIGURE 16 illustrates another embodiment in which 21 is a spacer.

As the present core unit is formed as described above, substantially no space will be produced between the magnetic core and shield can and the rate of utilization of the space will be high. As the normal fixing bases are provided in the opened part of the shield can, even if the pull-wires are many, they will be able to be connected simply.

What is claimed is:

A core unit comprising a bobbin consisting of a bobbin body in which is made a hole, a flange provided at each end of said bobbin body, a terminal fixing base provided on said flange, terminals and a shield connecting terminal provided on said terminal fixing base, a cut part made inside said shield connecting terminal, coils wound on said bobbin body, a shield foil inserted between said coils and a means of connecting a projecting part of said shield foil to the shield connecting terminal so as to be along said cut part, a magnetic core consisting of two parts each of which has a side wall opened in the upper part and bent in the form of U, a bottom surrounded by said side walls and a columnar part provided on the inside surface of each side wall, a U-shaped pressure spring and a box-shaped shield can, a combination of said magnetic core and bobbin by inserting the columnar parts of said magnetic core into the hole in the bobbin body being contained in said shield can through said pressure spring.

No references cited.

LEWIS H. MYERS, *Primary Examiner.*

T. J. KOZMA, *Assistant Examiner.*